United States Patent [19]
Kimura et al.

[11] Patent Number: 5,955,515
[45] Date of Patent: *Sep. 21, 1999

[54] WATER-BASED INK FOR INK-JET, AND INK-JET RECORDING METHOD AND INSTRUMENTS USING THE INK

[75] Inventors: Isao Kimura, Kawasaki; Hiroyuki Maeda, Yokohama; Hidemi Kubota, Komae; Tatsuya Ohsumi, Kyoto, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/534,105

[22] Filed: Sep. 26, 1995

[30] Foreign Application Priority Data

| Sep. 29, 1994 | [JP] | Japan | 6-259023 |
| May 19, 1995 | [JP] | Japan | 7-144231 |
| Aug. 25, 1995 | [JP] | Japan | 7-239011 |

[51] Int. Cl.$^6$ .................................. C09D 11/10
[52] U.S. Cl. ................ 523/161; 524/495; 524/560; 524/561; 524/762; 525/902; 260/DIG. 38; 106/31.13; 106/31.27; 106/31.33; 106/31.43
[58] Field of Search .................... 523/161, 201; 260/DIG. 38; 106/20 D, 22 C, 22 R; 524/495, 560, 561, 762; 525/902

[56] References Cited

U.S. PATENT DOCUMENTS

| 4,246,154 | 1/1981 | Yao | 524/88 |
| 4,680,332 | 7/1987 | Hair et al. | 524/377 |
| 5,100,471 | 3/1992 | Winnik et al. | 106/23 C |
| 5,254,158 | 10/1993 | Breton et al. | 106/20 R |

FOREIGN PATENT DOCUMENTS

| 0584509 | 3/1994 | European Pat. Off. . |
| 58-13675 | 1/1983 | Japan . |
| 62-053377 | 3/1987 | Japan . |
| 62-181372 | 8/1987 | Japan . |
| 01272623 | 10/1989 | Japan . |
| 03172362 | 7/1991 | Japan . |
| 03240586 | 10/1991 | Japan . |
| 6009848 | 1/1994 | Japan . |
| 0649399 | 2/1994 | Japan . |

OTHER PUBLICATIONS

"Design Criteria and Future Directions in Inkjet Ink Technology", Industrial & Engineering Chemistry Research, vol. 28, No. 11 (Nov. 1989).

Primary Examiner—Marion McCamish
Assistant Examiner—John J. Guarriello
Attorney, Agent, or Firm—Fitzpatrick, Cella, Harper & Scinto

[57] ABSTRACT

Disclosed herein is a water-based ink for ink-jet, comprising a liquid composition containing a coloring material and a liquid medium, wherein the ink comprises a heat-reversible type thickening polymer.

31 Claims, 6 Drawing Sheets

PRINTING DIRECTION →

PRINTING DIRECTION →

1 DOT LINE/SPACE

WATER-BASED INK FOR INK-JET, AND INK-JET RECORDING METHOD AND INSTRUMENTS USING THE INK

BACKGROUND OF THE INVENTION

1. Field of the Invention

The present invention relates to a water-based ink suitable for use in ink-jet recording in which an ink is ejected and flown as droplets from an orifice, and these ink droplets are applied to the surface of a recording medium, thereby conducting recording, and an ink-jet recording method and instruments using such an ink, and particularly to an ink-jet ink capable of preventing the occurrence of feathering and bleeding and forming images high in color strength, and an ink-jet recording method and instruments using such an ink.

2. Related Background Art

Water-based inks have heretofore been principally used as ink-jet recording inks from the viewpoint of safety, odor and the like. There have been known inks in which one or more of various water-soluble dyes or pigments are dissolved or dispersed in water or a mixed solvent of water and a water-soluble organic solvent, and a humectant, a dye-dissolving aid, a mildewproofing agent and/or the like are added thereto as needed. For the past few years, ink-jet recording has conspicuously spread because it has such advantages as: an ink can be ejected in a proportion of several thousand droplets per second to conduct high-speed recording with ease, noise is scarcely produced, multi-color recording can be performed with ease, high-resolution recording can be effected, and recording can be conducted on plain paper.

With the development of low-cost and high-performance personal computers and the standardization of GUI environment in recent years, even image recording by printers or the like has been required to achieve high coloring, high quality, high-fastness properties, high-resolution recording, high-speed recording and the like. In response to this requirement, various technical ideas that a coloring material component is left on the surface of paper as much as possible to increase the optical density of images to be formed, edges of printed dots are made sharp, and the occurrence of feathering, bleeding and the like is lessened are also being proposed in ink-jet recording.

As the first example thereof, Japanese Patent Application Laid-Open No. 58-13675 has disclosed a method of controlling the absorption and spreading of recording dots in and on paper by adding polyvinyl pyrrolidone to an ink. As the second example thereof, Japanese Patent Application Laid-Open No. 3-172362 has also disclosed a method of controlling the absorption of an ink and the spreading of dots by adding a specific microemulsion to the ink.

As the third example in which a sol-gel transition phenomenon is applied to an ink, Japanese Patent Application Laid-Open Nos. 62-181372 and 1-272623 each have described an ink which is in a gel state at room temperature, but turns to a sol state by heating. It is said that according to such an ink, the penetration of the ink into paper can be controlled because recording on the recording medium is conducted in the sol state, and the ink turns to a gel state by its cooling.

As the fourth example, Japanese Patent Application Laid-Open No. 6-49399 has recently disclosed an ink, to which a compound having reversibly and thermally gelling property is added, and which has good coloring ability and fixing ability, causes little feathering, provides prints excellent in shelf stability, and is also excellent in reliability, and an ink-jet recording method and instruments using such an ink. The technical background thereof is based on a phenomenon that when an aqueous solution of a specific water-soluble polymer is gradually heated, its water-solubility is lowered, and so the solution becomes cloudy (a temperature at which such a phenomenon occurs is called "clouding point").

Typical examples of the water-soluble polymer include N-isopropylacrylamide, polyvinyl methyl ether, polyethylene oxide and hydroxypropylcellulose. Since these polymers have a negative temperature coefficient as to solubility, they are in a state separated and deposited from the solution at a temperature not lower than the clouding point. In such a deposited state, hydrophobic microgel is formed, and the viscosity of the solution decreases. When recording on a recording medium is conducted in the deposited state, the viscosity of the solution returns to the initial viscosity, i.e., increases, owing to a temperature drop on the recording medium, and so the penetration of the ink can be prevented.

As the fifth example, M. Croucher et al. have indicated problems involved in the conventional homogeneous inks and moreover proposed, as a future ink for ink-jet, a heterogeneous ink making use of a latex. [M. D. Croucher and M. L. Hair, "Design Criteria and Future Directions in Inkjet Ink Technology", Ind. Eng. Chem. Res., 28, 1712–1718 (1989)].

U.S. Pat. No. 4,246,154 has disclosed an ink in which fine particles of a vinyl polymer are colored with a dye and anionically stabilized. U.S. Pat. No. 4,680,332 has also disclosed a heterogeneous ink in which a water-insoluble polymer containing an oil-soluble dye and combined with a nonionic stabilizer is dispersed in a liquid medium. Further, U.S. Pat. No. 5,100,471 has proposed a water-based ink comprising a solvent and colored particles composed of a polymer core and a silica shell to which a dye has been bonded by covalent bonding, and described this ink as having such features as a brighter color is developed on paper, it is stable to temperature change, and it provides images high in water fastness.

On the other hand, as the sixth example, Japanese Patent Application Laid-Open No. 3-240586 has proposed, as a nonaqueous ink, an ink in which colored particles coated with a resin that can swell with a dispersion medium are dispersed in kerosene or the like. In this proposal, it is said that the ink is effective in, particularly, prevention of image feathering and of clogging at an orifice for ejecting ink droplets.

However, the above-described first and second examples of the prior art involve a problem of the fixing ability of the ink in that since the penetration into paper is prevented, the ink does not penetrate into the paper, and hence remains on the paper for a long time. A problem that color mixing (bleeding) occurs between inks of different colors also arises.

The ink based on the sol-gel transition of the third example involves a problem that running behavior may arise due to changes in storage temperature of the resulting prints, and so staining by color mixing and transfer due to running of images occurs.

The inks containing the reversibly and thermally gelling compound of the fourth example are unfit for a recording method in which one pixel is recorded at high speed in several tens of milliseconds or shorter like ink-jet recording because it uses a water-soluble cellulose ether, and so its viscosity increase is slow. If the ink is used in ink-jet recording, such a compound must be used in a low concentration because the upper limit of viscosity upon ejection of the ink is as low as at most 20 mPa.s. It is hence difficult to sufficiently achieve the thickening effect.

On the other hand, among the fifth example group, the ink in which the coloring material has been anionically stabilized involves a problem that a pH region in which the coloring material is stably dispersed is narrow, and the selection range of the dye is hence limited. In addition, it has a disadvantage that printed dots thereof are small in spread on paper, and an optical density (OD) required is hence hard to achieve. With respect to the reduction of fixing time, which is required for high-speed recording, the ink has little effect because fixing depends on only evaporation and penetration like the conventional image-forming means.

According to the disperse ink comprising a polymer containing the oil-soluble dye and combined with the nonionic stabilizer, the selection range of the dye can be widened. As with the above ink, however, this ink has little effect on the shortening of fixing time because fixing is based on a mechanism depending on evaporation and penetration. In addition, the ink is disadvantageous even from the viewpoint of color mixing (bleeding) between inks of different colors because it takes a lot of time to fix adjacent dots.

The disperse ink of the polymer core/silica shell structure is excellent in dispersion stability of the pigment, but does not provide a sufficient OD because the ink has no particular means for the aggregation of the coloring material on the surface of paper. In addition, the ink has little effect on the reduction of fixing time because fixing depends on evaporation and penetration. Therefore, the ink involves a problem that bleeding occurs.

A problem common to the above three examples, is that the rub-off resistance of recorded images is poor because the adhesion of the coloring material to the surface of paper is not taken into consideration in such inks.

The sixth example in the prior art involves problems of odor, safety and the like because it uses kerosene as a dispersion medium.

To eject ink droplets, water-based inks, particularly, ink-jet inks are required to have such physical properties as the surface tension is greater than 20 dyn/cm (related to refilling speed), the viscosity is within a range of from 1 to 20 mPa.s, pH is about 3 to 10, and fixing time is shorter than 20 seconds (it is better to be the shortest possible time).

Here, the transfer of ink to paper is considered. With respect to the transfer phenomenon of liquid to paper, the Lucas-Washburn equation has been generally known. Supposing an amount of the liquid transferred, a roughness index of the paper, an absorption coefficient, transferring time and wetting-starting time are V, Vr, Ka, T and Tw, respectively, in case the liquid is water, the amount of the liquid transferred V is represented by the equation $$V = Vr + Ka\sqrt{T - Tw}. \quad (1)$$

In the equation (1), Ka is related to physical properties of both paper and ink and is represented by the equation $$Ka = \sqrt{r \cdot \gamma \cos\theta / 2\eta} \quad (2)$$

wherein r is a capillary radius of the paper, γ is a surface tension of the liquid, θ is a contact angle, and η is a viscosity of the liquid.

It is understood from the equation (1) that in order to leave a coloring material on the surface of the paper, it is necessary to delay the penetration of the liquid, namely, make Ka small, as far as possible (the time of evaporation can be gained by making Ka small). It is understood from the equation (2) that it is only necessary that the surface tension γ, viscosity η and contact angle θ be made low, high and great, respectively, as physical properties of an ink required to do so. However, the physical properties of the ink-jet ink as described previously are variously limited. It is thus difficult to control Ka.

On the other hand, when a nonaqueous solvent, for example, ethanol, is used as the liquid, the wetting-starting time Tw in the equation (1) may be ignored. Therefore, fixing can be accelerated. However, Ka also becomes greater, and so the penetrating effect is increased, resulting in an image on which "feathering" occurs to a great extent. In addition, the term of cos θ in the equation (2) is determined by the combination of ink and paper. Therefore, whether the quality of images is good or poor depends on the kind of paper used. Namely, such an ink cannot satisfy paper nondependence.

It is considered that the above-mentioned problems may arise even on the conventional coloring material-dispersed inks so far as their image formation depends on penetration and evaporation.

SUMMARY OF THE INVENTION

It is accordingly an object of the present invention to provide an ink-jet ink which can solve the above problems involved in the prior art, in particular, can prevent the occurrence of feathering and bleeding and form images high in color strength, and an ink-jet recording method and ink-jet instruments using such an ink.

The above object can be achieved by the present invention described below.

According to the present invention, there is thus provided a water-based ink for ink-jet, comprising a liquid composition containing a coloring material and a liquid medium, wherein the ink comprises a heat-reversible type thickening polymer.

According to the present invention, there is also provided an ink-jet recording method comprising ejecting droplets of an ink out of an orifice of a recording head in accordance with a recording signal to conduct recording on a recording medium, wherein said ink is the ink described above.

According to the present invention, there is further provided a recording unit comprising an ink container portion with an ink held therein and a head from which the ink is ejected in the form of ink droplets, wherein said ink is the ink described above.

According to the present invention, there is still further provided an ink-jet recording apparatus comprising a recording unit having an ink container portion with an ink held therein and a head from which the ink is ejected in the form of ink droplets, wherein the recording unit used in said recording apparatus is the recording unit described above.

DESCRIPTION OF THE PREFERRED EMBODIMENTS

Figure 1:
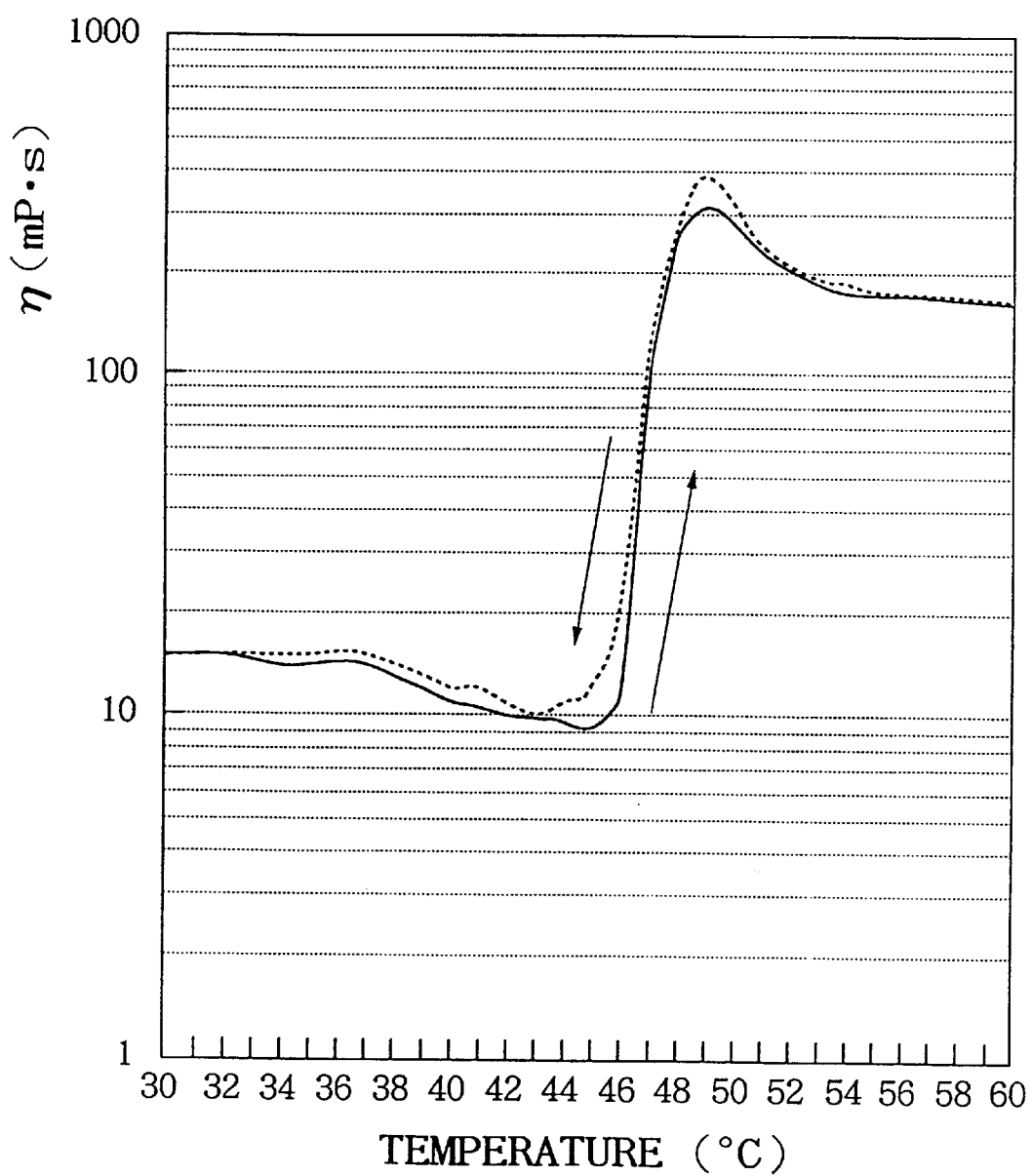
FIG. 1 illustrates a relationship between temperature and viscosity of an aqueous solution of a heat-reversible type thickening polymer useful in the practice of the present invention.

The present inventors have considered that the above-described limitations in the prior art are attributable to the fact that an ink always comprises a homogeneous liquid composed of a coloring material and a solvent irrespective of temperature, and thus discovered an ink composed of the above constitution, in which the ink undergoes a change of state, which is triggered off by temperature, so that a coloring material and a solvent separately behave on a recording medium.

More specifically, such change of state means the formation of a state that a polymer which is dissolving and dissociating in an ink at room temperature undergoes association between its molecules when heated at a certain temperature (transition temperature) or higher, so that a concentrated high-viscosity liquid is formed, and the polymer combines with a coloring material. When the ink of such a state is applied to a recording medium to conduct recording, a concentrated coloring material phase is left on the surface of the recording medium, while a dilute solvent phase penetrates into the recording medium.

In order to accommodate wide-ranging environmental temperatures upon recording, the above change must be reversible. Therefore, since it is advantageous in high-speed recording that the viscosity of an ink be lower upon ejection of ink droplets from a recording head, the above phenomenon is actually realized by ejecting the ink in a state that its viscosity is low upon operation, while heating a recording medium to a transition temperature or higher in advance to conduct recording on this medium.

In the above conditions, the surface of the recording medium is cooled at a moment the ink droplets are applied to the surface of the recording medium because of "(the temperature of the ink droplets)<(the temperature of the recording medium)". Therefore, there is a slight time lag while the ink droplets are heated to the transition temperature. More specifically, since the ink is maintained at a low viscosity within the time until the viscosity is increased, the ink penetrates into the recording medium according to the Lucas-Washburn equation. As a result, this method serves as a means for solving the problem of rub-off, which has heretofore occurred on recorded images where the whole coloring material has been left on the surface of the recording medium.

Besides the above method, the effect of preventing feathering is also exhibited by heating an ink in advance so as to reach a certain temperature (or viscosity), which is a transition temperature at which the ink can be ejected, thereby causing partial association of the polymer, and applying droplets of such an ink to a recording medium to conduct recording.

It is desirable that the transition temperature of the heat-reversible type thickening polymer added to the ink according to the present invention be higher than the environmental temperature (room temperature) at which a recording apparatus is generally used, and a polymer having a transition temperature not lower than 30° C. but not higher than 100° C. be used in order to effectively make the thickening by the temperature change (;or make a difference between temperatures before and after the change of state greater). The use of a polymer having a transition temperature lower than 100° C. is preferred because marked increase in viscosity due to evaporation of water in the ink is not caused.

The present invention will hereinafter be described in more detail by preferred embodiments.

The heat-reversible type thickening polymer, which is used in the ink according to the present invention, and dissolves and dissociates or associates and thickens at a certain transition temperature, will be first described.

The heat-reversible type thickening polymer means a polymer the aqueous solution or aqueous suspension of which thickens at a certain temperature (transition temperature) or higher, and the relationship between the temperature and viscosity of which is reversible.

Specific preferable examples of the above-described polymer useful in the practice of the present invention include water-soluble vinyl polymers (A) comprising at least 50% by weight of a vinylcarboxylic ester (a) of an alkylene oxide adduct of an active hydrogen compound having a nitrogen-containing ring as a constituent unit. More specifically, the polymers (A) include copolymers of the ester (a) and the (meth)acrylic ester (b) of an adduct of a nitrogen-containing alicyclic compound with an ethylene oxide-propylene oxide block copolymer, and those in which the ester (a) is the (meth)acrylic ester of an adduct of (substituted) morpholine with 1 to 20 moles of ethylene oxide and/or propylene oxide.

Example of the active hydrogen compound having a nitrogen-containing ring include compounds having a nitrogen-containing ring and at least one active hydrogen to which an alkylene oxide is added, and more specifically, nitrogen-containing alicyclic compounds, for example, compounds having an aziridine ring (aziridine, 2-methylaziridine, etc.), compounds having a pyrrolidine ring (pyrrolidine, 2-methylpyrrolidine, 2-pyrrolidone, succinimide, etc.), compounds having a piperidine ring (piperidine, 2-methylpiperidine, 3,5-dimethylpiperidine, 2-ethylpiperidine, 4-piperidinopiperidine, 4-pyrrolidinopiperidine, ethyl pipecolinate, etc.), compounds having a piperazine ring (1-methylpiperazine, 1-methyl-3-ethylpiperazine, etc.), compounds having a morpholine ring (morpholine, 2-methylmorpholine, 3,5-dimethylmorpholine, etc.), $\epsilon$-caprolactam, nitrogen-containing unsaturated cyclic compounds (3-pyrroline, 2,5-dimethyl-3-pyrroline, 2-hydroxypyridine, 4-pyridylcarbinol, 2-hydroxypyrimidine, etc.), and the like.

Of these, the nitrogen-containing alicyclic compounds are preferred, the compounds having a piperidine ring are more preferred, with the compounds having a morpholine ring being most preferred.

In the present invention, ethylene oxide, propylene oxide and butylene oxide are preferred as the alkylene oxide.

The transition temperature of the heat-reversible type thickening polymer in the present invention may be controlled with ease by adjusting the kind of these alkylene oxides and the number of moles of the alkylene oxide to be added. In the case of ethylene oxide by way of example, the transition temperature becomes higher as the number of moles to be added increases. In the case of propylene oxide or butylene oxide, the transition temperature becomes lower as the number of moles of the alkylene oxide to be added increases. The number of moles of the alkylene oxide to be added is preferably of the order of from 1 to 20 moles, more preferably from 1 to 5 moles.

The vinylcarboxylic ester (a) of an alkylene oxide adduct of the active hydrogen compound having a nitrogen-containing ring is an ester of the alkylene oxide adduct as described above with a vinylcarboxylic acid. As the vinylcarboxylic acid, methacrylic acid, acrylic acid, maleic acid, vinylbenzoic acid and derivative thereof are preferred, with (meth)acrylic acid and derivatives thereof being particularly preferred.

The water-soluble vinyl polymer (A) in the present invention may be either a polymer composed of at least one of the esters (a) described above or a copolymer composed of at least one of the esters (a) and another vinyl monomer so far as the polymer comprises, as a constituent unit, at least one ester (a) in an amount of at least 50% by weight.

Preferable examples of another vinyl monomer used in this case include hydroxyethyl (meth)acrylate, polyethylene glycol mono(meth)acrylate, (meth)acrylamide, N-hydroxymethyl(meth)acrylamide, N-vinyl-2-pyrrolidone, (meth)acrylic acid, maleic acid (anhydride), styrene:sulfonic acid, N,N-dimethylaminoethyl (meth)acrylate, N,N-diethylaminopropyl (meth)acrylate, methyl (meth)acrylate, butyl (meth)acryl(met glycidyl (meth)acrylate, N-butyl (meth)acrylamide, N-cyclohexyl-(meth)acrylamide, (meth)acrylonitrile, styrene, vinyl acetate, vinyl chloride, butadiene and isoprene.

A temperature range of thickening varies according to the proportion occupied by the ester (a) among the monomers constituting the water-soluble vinyl polymer (A). In order to narrow the temperature range as much as possible, the ester (a) is preferably contained as a constituent unit in a proportion of at least 50% by weight, more preferably at least 70% by weight.

When the heat-reversible type thickening polymer as described above is dissolved in water, the viscosity of such a solution decreases as the temperature rises until it is heated to a certain transition temperature. However, the viscosity increases at a sharp slope when the solution is heated to a temperature higher than the transition temperature. Further, the solution features that the relationship between the temperature and the viscosity scarcely has hysteresis. When a 10% by weight aqueous solution thereof is heated at a rate of temperature rise of 1° C./min, the temperature gradient of its viscosity is at least 40 mPa.s/° C. at a temperature not lower than the transition temperature. Therefore, a thickening effect can be sufficiently achieved on a recording medium.

As described above, the transition temperature can be controlled with ease to an optional temperature by changing the kind of the alkylene oxide in the ester (a) making up the heat-reversible type thickening polymer and the number of moles of the alkylene oxide to be added. Therefore, the ink according to the present invention can be applied to various recording heads the temperature-rise properties of which vary according to their forms, recording methods and the like.

However, the transition temperature of the heat-reversible type thickening polymer varies according to the kinds and amounts of additive components, such as salts, surfactants and solvents, in the ink. It is therefore necessary to adopt a transition temperature in an ink composition to be applied.

FIG. 1 illustrates an exemplary relationship between temperature and viscosity of a 10% by weight aqueous solution of a heat-reversible type thickening polymer having the constitution described above. The viscosity was measured by means of VM-100 manufactured by Yamaichi Denshi while heating and stirring the aqueous solution by a hot stirrer Nuova II manufactured by Thermolyne. A polymeric compound used was obtained by adding 100 parts by weight of 2-(2-morpholinoethoxy)ethyl methacrylate (the methacrylic ester of an adduct of morpholine with 2 moles of ethylene oxide) and 0.1 part by weight of 2,2'-azobis(2, 4-dimethylvaleronitrile) into an ampule, freeze-deaerating the resulting mixture, hermetically sealing the ampule, and then polymerizing the ester at 60° C. for 8 hours. In FIG. 1, a solid line indicates a case where the aqueous solution was heated at a rate of temperature rise of 1° C./min, while a broken line indicates a case where the aqueous solution was cooled at a rate of temperature drop of 1° C./min. The transition temperature was 46° C.

As a second heat-reversible type thickening polymer useful in the practice of the present invention, which has a different constitution from that of the above-described heat-reversible type thickening polymer, is mentioned a material obtained by copolymerizing the vinylcarboxylic ester monomer (a) and the (meth)acrylic ester (b) of an adduct of a nitrogen-containing alicyclic compound with an ethylene oxide-propylene oxide block copolymer represented by the general formula

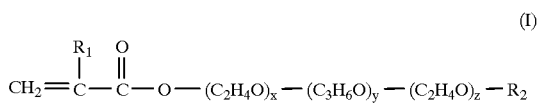

wherein $R_1$ is H or $CH_3$, $R_2$ is a substituent group derived from a compound selected from the group consisting of the nitrogen-containing alicyclic compounds of the formulae

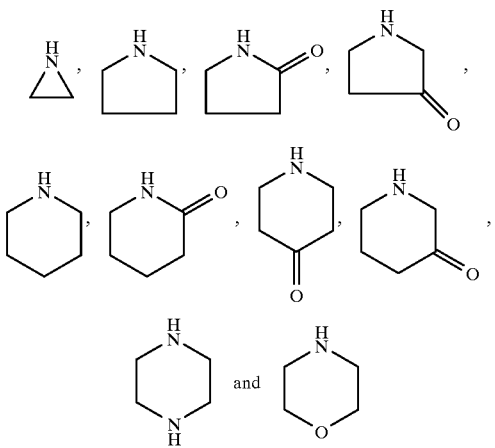

and bonded by a nitrogen atom thereof, x is an integer of 2 to 50, y is an integer of 1 to 50, and z is 0 or an integer of 1 to 50.

The function of the above monomer (b) is described. Since the monomer (b) has many ether oxygen atoms in a linear molecule as represented by the general formula (I), a positive-charge moiety of a salt predominantly coordinates to this ether oxygen if the salt coexists. Therefore, when the heat-reversible type thickening polymer having the constitution as described above is used in the present invention, the change of state of this polymer is not affected by the salt. More specifically, the salt resistance of the heat-reversible type thickening polymer can be sharply improved by copolymerizing the monomer (b) as described above with the monomer (a). As described above, the nitrogen-containing cyclic substituent group which is bonded by an N atom to a terminal is introduced, thereby making it possible for the polymer to form a coordinate bond with a coloring material molecule such as a dye. As a result, the water fastness of the coloring material is improved.

The monomer (b) is an ester of a polyether monool, in which the nitrogen-containing cyclic compound as described above is added to a terminal of an ethylene oxide-propylene oxide block copolymer, with (meth)acrylic acid. Specific examples thereof include ω-morpholino-(poly)propylene glycol-polyethylene glycol monoacrylate, ω-morpholino(poly)propylene glycol-polyethylene glycol monomethacrylate, ω-morpholino(poly)ethylene glycol-(poly)propylene glycol-(poly)ethylene glycol monoacrylate, ω-morpholino-(poly)ethylene glycol-(poly)propylene glycol-(poly)ethylene glycol monomethacrylate, ω-piperidino-(poly)propylene glycol-polyethylene glycol monoacrylate, ω-piperidino(poly)propylene glycol-polyethylene glycol monomethacrylate, ω-piperidino(poly)ethylene glycol-(poly)propylene glycol-(poly)ethylene glycol monoacrylate, ω-piperidino(poly)ethylene glycol-(poly) propylene glycol-(poly)ethylene glycol monomethacrylate, ω-ethyleneimino-(poly)propylene glycol-polyethylene glycol monoacrylate, ω-(2-pyrrolidinonyl)(poly)propylene glycol-polyethylene glycol monoacrylate, ω-(3-pyrrolidinonyl)(poly)propylene glycol-polyethylene glycol monoacrylate, ω-(2-piperidinonyl)(poly)propylene glycol-polyethylene glycol monoacrylate and ω-(4-piperidinonyl)(poly) propylene glycol-polyethylene glycol monoacrylate. Of these, the esters having a piperidine ring or a morpholine ring are preferred, with the esters having a morpholine ring being most preferred.

As an example of a process for synthesizing the monomer (b), may be mentioned a process in which a polyether monool obtained by successively adding alkylene oxides (ethylene oxide, propylene oxide and butylene oxide) to the nitrogen-containing alicyclic compound in the presence of an alkali metal catalyst at 50 to 200° C. under 1 to 10 atm, and further adding ethylene oxide, and methacrylic acid or acrylic acid are esterified in the presence of an acid catalyst (sulfuric acid and p-toluene-sulfonic acid, and the like) at 50 to 200° C. under 1 to 10 atm, or esterified together with an esterifying agent (dicyclohexylcarbodiimide or the like) at −10 to 50° C. under ordinary pressure.

Figure 2:
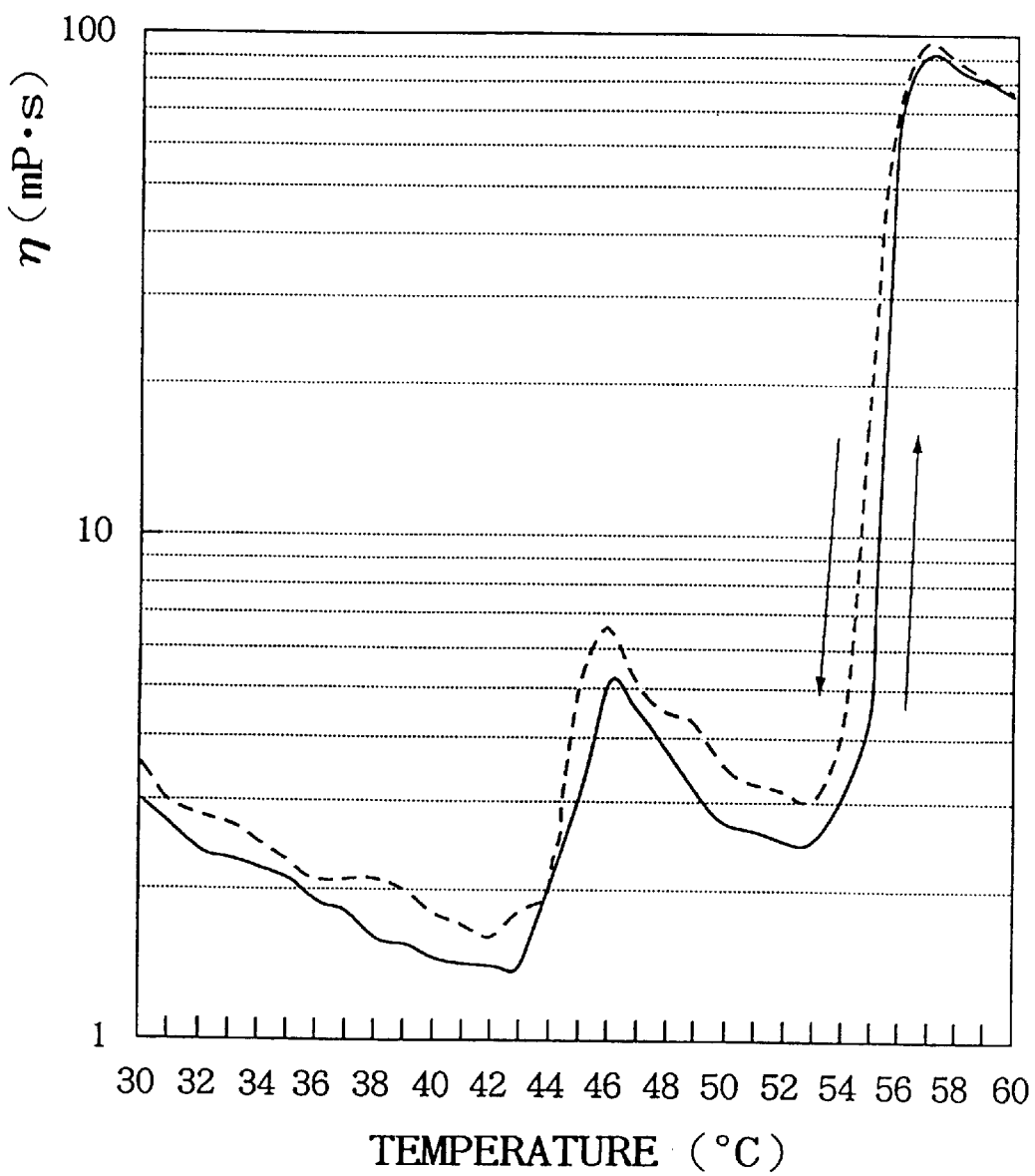
FIG. 2 illustrates a relationship between temperature and viscosity of an aqueous solution of a second heat-reversible type thickening polymer useful in the practice of the present invention.

FIG. 2 illustrates an exemplary relationship between temperature and viscosity of a 10% by weight aqueous solution of the second heat-reversible type thickening polymer used in the present invention. A polymeric compound used in this case was obtained by using 90 parts by weight of morpholine ethylene oxide (3 mol) methacrylate as the monomer (a), 10 parts by weight of a monomer (b) having the following structure and 0.1 part by weight of 2,2'-azobis (2,4-dimethylvaleronitrile), adding them into an ampule, freeze-deaerating the resulting mixture, hermetically sealing the ampule, and then polymerizing the monomers at 60° C. for 8 hours.

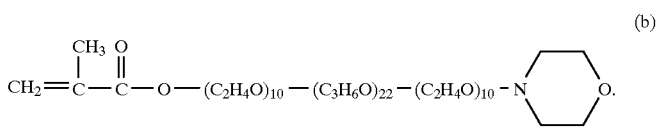

(b)

In FIG. 2, a solid line indicates a case where the aqueous solution was heated at a rate of temperature rise of 1° C./min, while a broken line indicates a case where the aqueous solution was cooled at a rate of temperature drop of 1° C./min. As apparent from FIG. 2, the relationship between temperature and viscosity shows two-stage thickening characteristics as illustrated in FIG. 2 because the monomers (a) and (b) have individual transition temperatures.

In the present invention, the molecular weight of the heat-reversible type thickening polymer and the amount thereof to be added must be controlled within the tolerance (20 mPa.s or lower) for viscosity of ink-jet recording ink. Therefore, the weight average molecular weight of the polymer is preferably controlled within a range of from 1,000 to 1,000,000 (both inclusive). Namely, when the weight average molecular weight is controlled to 1,000,000 or lower, such a polymer undergoes neither reduction in redissolving speed nor development of stringiness. It is hence preferable to use such a polymer. However, the effects of the present invention are sufficiently achieved even when heat-reversible type thickening polymers different in weight average molecular weight from each other are used in combination so far as the molecular weight falls within the above range.

The present inventors have also found that when the heat-reversible type thickening polymer as described above is contained in an ink, sufficient recordability can be imparted to the ink, and moreover when a dispersion of hydrophobic fine particles is contained in the ink to obtain the thickening effect at a temperature not lower than the transition temperature, the thickening effect can be more sufficiently exhibited.

More specifically, the hydrating ability of the heat-reversible type thickening polymer is reduced at a temperature not lower than the transition temperature, and this polymer hence becomes hydrophobic in its aqueous solution. When a dispersion of hydrophobic (polymeric) fine particles such as, for example, an acrylic emulsion coexist in the aqueous solution in this state, the heat-reversible type thickening polymer undergoes association with these fine particles dispersed in the aqueous solution entangled therein because the affinity of the heat-reversible type thickening polymer for the hydrophobic fine particles is superior to that for water. It is hence considered that such a combination makes the whole system more thickened than the case of the heat-reversible type thickening polymer alone.

The percent enhancement of the thickening effect owing to the coexistence of the fine particles varies according to the kinds and amounts of the fine particles and a dispersant to be used, and the like. However, in an experiment by the present inventors, a viscosity increase of from 10 to 50% was recognized. Examples of fine particles usable for this purpose include acrylic emulsions, styrene-acrylic emulsions, styrene-divinylbenzene emulsions, urethane emulsions and silicone-acrylic emulsions. It is preferable to add, into the ink, an emulsion having a solid content of from 8 to 40% by weight, a particle diameter of from 10 to 80 nm and a pH of from 6.0 to 8.5 in an amount of from 0.1 to 10% by weight.

A polymer for the emulsion should be selected from those having high heat resistance and hardness. A polymer having a degree of crosslinking as high as possible is suitable for use in ink-jet. In particular, in the case where an ink-jet recording system is a method in which thermal energy is applied to an ink to conduct recording, a polymer which undergoes crosslinking at a critical temperature of water, which is a principal liquid medium for the ink, or higher is desirably used. More specifically, it is preferable to use a polymer having a temperature $T_b$ of 10% by weight loss of at least 300° C. Among the above-mentioned emulsions, a styrene-divinylbenzene copolymer ($T_b$: 380° C.) having a high degree of crosslinking is particularly preferred.

Description is then given as to the coloring materials used in the inks according to the present invention. Examples of coloring materials usable in the present invention include dyes, carbon black or organic pigments, fine coloring material particles, in which a dye is bonded to surfaces of fine particles to make the dye water-insoluble, and fine coloring material particles, in which a dye is chemically bonded to organic fine particles of a core/shell structure having a reactive group on the surface of the shell.

First of all, the dye usable as a coloring material in the present invention may be any dye so far as it undergoes interaction with the heat-reversible type thickening polymer used in the present invention to accelerate the association of polymer chains. Examples thereof include direct dyes, acid dyes, food colors, basic dyes and reactive dyes. Most of them have a hydrophobic dye skeleton, a few solubilizing groups such as sulfonates (—SO$_3$M), carboxylates (—COOM) and/or ammonium salts (NH$_4$X), and a few hydrogen-bonding hydroxyl groups (—OH), amino groups (—NH$_2$) and/or imino groups (—NH—), and can form complexes with the heat-reversible type thickening polymer used in the present invention. The disperse dyes themselves are water-insoluble. However, since they are used in combination with a polycyclic anionic activator such as a naphthalenesulfonate, the apparent ionicity of the dyes are anionic like the direct dyes, and such dyes may hence be used like the other dyes.

Specific examples of the above dyes include black dyes such as C.I. Direct Black 17, C.I. Direct Black 19, C.I. Direct Black 62, C.I. Direct Black 154, IJA 260, IJA 286, C.I. Food Black 2, C.I. Reactive Black 5, C.I. Acid Black 52 and I.C.I. Projet Fast Black 2; yellow dyes such as C.I. Direct Yellow 11, C.I. Direct Yellow 44, C.I. Direct Yellow 86, C.I. Direct Yellow 142, C.I. Direct Yellow 330, C.I. Acid Yellow 3, C.I. Acid Yellow 38, C.I. Basic Yellow 11, C.I. Basic Yellow 51, C.I. Disperse Yellow 3, C.I. Disperse Yellow 5 and C.I. Reactive Yellow 2; magenta dyes such as C.I. Direct Red 227, C.I. Direct Red 23, C.I. Acid Red 18, C.I. Acid Red 52, C.I. Basic Red 14, C.I. Basic Red 39, C.I. Disperse Red 60 and IJR-016; and cyan dyes such as C.I. Direct Blue 15, C.I. Direct Blue 199, C.I. Direct Blue 168, C.I. Acid Blue 9, C.I. Acid Blue 40, C.I. Basic Blue 41, C.I. Acid Blue 74 and C.I. Reactive Blue 15.

Besides these dyes, all dyes improved in water fastness by reducing the number of the solubilizing groups, dyes of special grade, in which their solubility is made sensitive to pH, and the like may be used in the present invention. The concentration of the dye in the ink may be freely selected within limits of its solubility. In general, it is preferably from 1 to 8% by weight. It is preferably from 3 to 10% by weight in the case where the resulting ink is used in recording on cloths, metals (anodized aluminum) and the like. Further, it is preferably from 0.01 to 10% by weight in the case where varied optical densities must be imparted to the resulting recorded image.

As second coloring materials, carbon black and organic pigments may be used. Since these coloring materials are used in combination with a dispersant like the disperse dyes, they may undergo interaction with the polymeric compound according to the present invention through the dispersant. As such a pigment, any pigment may be used so far as it is fit for ink-jet recording. In particular, as carbon black used in a black ink, it is desirable to use those produced in accordance with the furnace process or channel process and having such properties that the primary particle diameter is from 10 to 40 m$\mu$, the specific surface area is from 50 to 300 m$^2$/g as determined in accordance with the BET method, and the oil absorption is from 40 to 150 ml/100 g as determined by using DBP.

Examples of the carbon black include No. 2300, No. 900, MCF 88, No. 33, No. 40, No. 45, No. 52, MA 7, MA 8 and #2200B (all, products of Mitsubishi Chemical Industries Limited); RAVEN 1255 and RAVEN 1060 (both, products of Columbian Carbon Japan Limited); REGAL 330R, REGAL 660R and MOGUL L (all, products of Cabot Company); Color Black FW 18, Printex 35 and Printex U (all, products of Degussa Company); and those obtained by subjecting the surfaces of these carbon black products to an oxidizing treatment or plasma treatment. Besides, organic pigments such as insoluble azo dyes, soluble azo dyes, phthalocyanine pigments, high-grade isoindolinone pigments, high-grade quinacridone pigments, dioxane violet and high-grade perinone and perylene pigments may preferable be used.

As coloring materials classified in the above pigments, so-called color lakes in which an extender pigment is dyed with a dye may also be used in the present invention.

As third coloring materials usable in the present invention, may be mentioned fine coloring material particle in which a dye is bonded to the surfaces of fine particles to make the dye insoluble. The fine coloring material particles, which will be described herein, are those in which a dye is chemically bonded to organic fine particles of a core/shell structure having a reactive group on the surface of the shell. Preferable examples thereof include those having a reactive group selected from the group consisting of a carboxyl group, a hydroxyl group, an amino group, an epoxide group, an amide group, a hydroxymethyl group and an isocyanate group.

As the part of the core in the core/shell type fine particles, there is used a styrene-divinylbenzene polymer having a high degree of crosslinking, into the surface of which the above-described reactive group is introduced. The thickness of the shell is preferably adjusted to about 30% of the diameter of the fine particle so as to be fully dyed with a dye.

More specifically, a fine particle dispersion, S2467 (product of Japan Synthetic Rubber Co., Ltd.) is preferred.

In order to use the dispersion S2467 as a coloring material, that having a particle diameter of from 10 to 80 nm and a solid content of 10% by weight as its properties is selected. That obtained by subjecting this fine particle shell to a surface modification with an amino group forms an ionic bond with, for example, a dye having an anionic dye ion, such as, a direct dye, whereby the shell can be easily dyed with such a dye. On the other hand, when the fine particle shell is modified with a carboxyl group, the modified shell forms an ionic bond with a dye having a cationic dye ion, such as, a basic dye, whereby the shell can be dyed.

The fine coloring material particles after the dyeing may be used as a coloring material for the ink according to the present invention by treating them in the same manner as the pigments described above. The use of such a coloring material improves the thickening effect like the addition of the dispersion of the fine particles. In addition, the coloring material is improved in water fastness compared with the case where only a dye is used, and so the fastness properties of the resulting recorded images may be enhanced.

Incidentally, these three kinds of coloring materials, which have been described above, may be used singly. However, it goes without saying that the combined use of the fine coloring material particles with the dye, or of the fine coloring material particles with the carbon black or the organic pigment is advantageous to a further improvement in the quality of the resulting recorded images in that high color strength can be achieved owing to the enhancement of the thickening effect, and edges of recorded dots are made sharper owing to the inclusion of the particles.

The inks according to the present invention, in which the heat-reversible type thickening polymer and the coloring material as described above are contained in a liquid medium, may contain such humectants and dissolving aids as mentioned below with a view toward further imparting suitability for ink-jet such as reliability, storage stability or the adjustment of penetrating ability of ink.

Examples of such materials include alkylene glycols such as 1,2-ethanediol, 1,2-propanediol, 1,3-propanediol, 1,2-butanediol, 1,3-butanediol, 1,4-butanediol, 2,3-butanediol, 1,5-pentanediol, 1,7-heptanediol, 2-methyl-2,4-pentanediol, 2-ethyl-1,3-hexanediol, diethylene glycol, triethylene glycol, tetraethylene glycol, polyethylene glycol 200 and dipropylene glycol, 2,2'-thiodiethanol; glycerol and 1,2,6-hexanetriol; alcohol amines such as monoethanolamine, diethanolamine and triethanolamine; aprotic polar solvents such as dimethylformamide, dimethylacetoamide, dimethyl sulfoxide, sulfolane and 1,3-propane sulfone; lower alkyl ethers of polyhydric alcohols, such as 1,2-dimethoxyethane, 1,2-diethoxyethane, 1,2-dibutoxyethane, diethylene glycol dimethyl ether, diethylene glycol diethyl ether, diethylene glycol dibutyl ether, 2-methoxyethanol, 2-ethoxyethanol, 2-(methoxymethoxy)ethanol, 2-butoxyethanol, diethylene glycol monomethyl ether, diethylene glycol monoethyl ether, diethylene glycol monobutyl ether, triethylene glycol monomethyl ether, 1-methoxy-2-propanol, 1-ethoxy-2-propanol, dipropylene glycol, dipropylene glycol monomethyl ether, dipropylene glycol monoethyl ether and tripropylene glycol monomethyl ether; formamide; 2-pyrrolidone; N-methyl-2-pyrrolidone; 1,3-dimethylimidazolidinone; sorbitol; sorbite; urea; and 1,3-bis(β-hydroxyethyl)urea. These compounds are preferably contained in the ink in a range of from 1% to 30% by weight based on the total weight of the ink.

When an alkyl alcohol such as methanol, ethanol, propanol, 2-propanol, 1-butanol or 2-butanol is contained in the ink, according to the present invention upon using such an ink in ink-jet recording, its ejection properties are improved. Such an ink is hence more effective. These alcohols are preferably contained in an amount ranging from 1% to 10% by weight based on the total weight of the ink.

As necessary, the ink according to the present invention may further contain additives such as surfactants, rust preventives, mildewproofing agents, antioxidants and pH adjustors.

As described above, the ink according to the present invention is effective upon use in ink-jet recording. Ink-jet recording methods include a recording method in which thermodynamic energy is applied to an ink to eject droplets of the ink, and a recording method in which thermal energy is applied to an ink to form bubbles in the ink, thereby ejecting droplets of the ink. The ink according to the present invention is particularly suitable for use in these recording methods.

Figure 3:
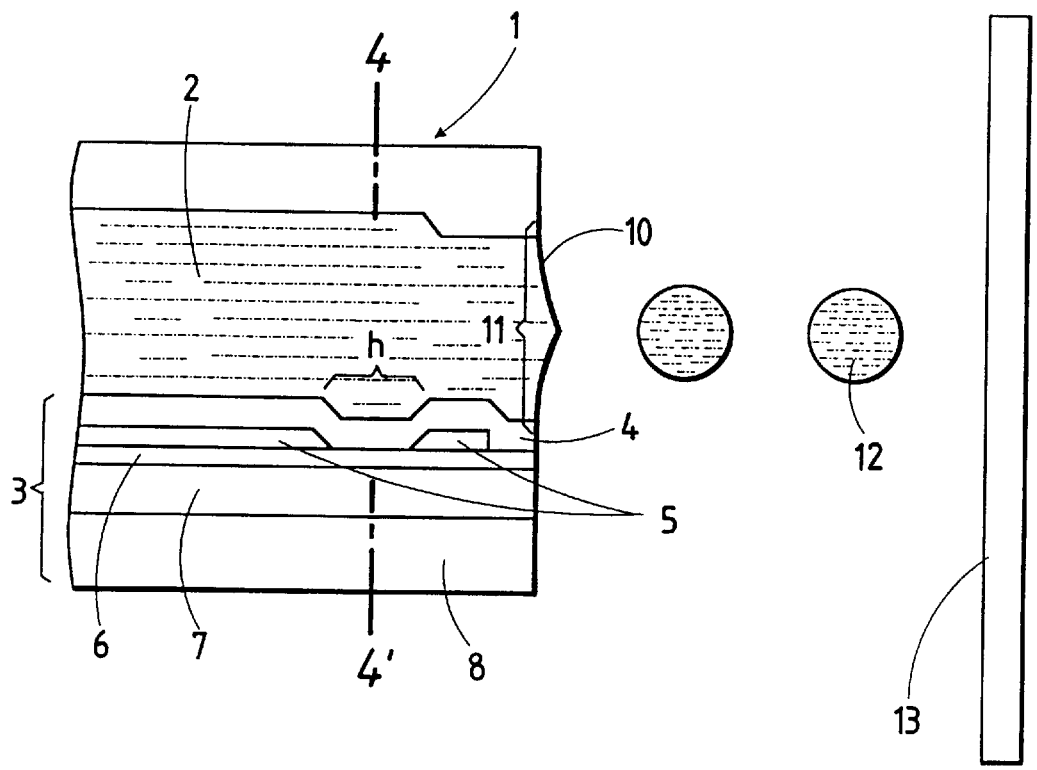
FIG. 3 is a longitudinal cross-sectional view of a head of an ink-jet recording apparatus.
Figure 4:
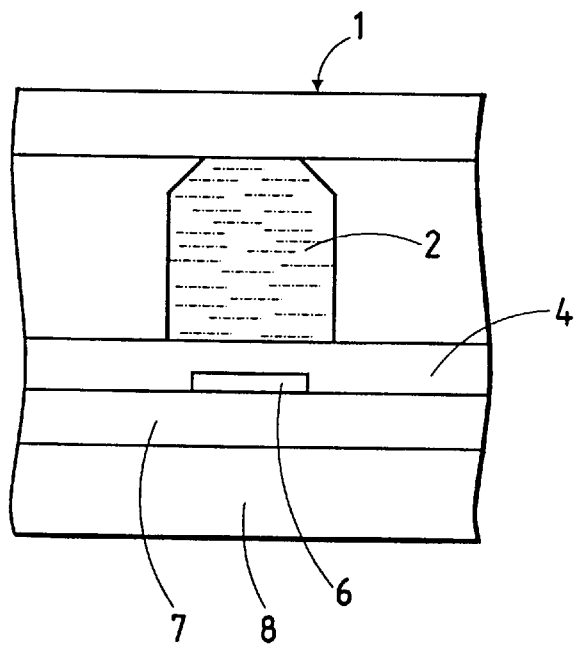
FIG. 4 is a transverse cross-sectional view of the head of the ink-jet recording apparatus.
Figure 5:
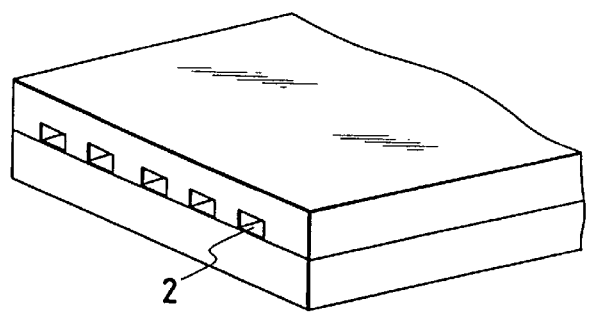
FIG. 5 is a view illustrating an exemplary head of the ink-jet recording apparatus, which is equipped with a plurality of nozzles.

Examples of the construction of an head, which is a main component of an apparatus using thermal energy as an ink-jet recording apparatus, are illustrated in FIGS. 3, 4 and 5.

A head 1 is formed by bonding a glass, ceramic, silicon or plastic plate or the like having a flow path (nozzle) 2 through which an ink is passed, to a heating element base 3. The heating element base 3 is composed of a protective layer 4 formed with silicon oxide, silicon nitride, silicon carbide or the like, electrodes 5 made of aluminum, gold, aluminum-copper alloy or the like, a heating resistor layer 6 formed with a high-melting material such as $HfB_2$, TaN or TaAl, a heat accumulating layer 7 formed with thermally oxidized silicon, aluminum oxide or the like, and a substrate 8 made of silicon, aluminum, aluminum nitride or the like having good heat radiating property.

Now, upon application of electric pulse signals to the electrodes 5 in the head, the heating element base 3 rapidly generates heat at the region shown by h to form bubbles in an ink which is in contact with the surface of this region. A meniscus 10 of the ink is projected by the action of the pressure thus produced, and the ink is ejected through the nozzle 2 of the head to fly out of an orifice 11 toward a recording medium 13 in the form of recording droplets 12.

FIG. 5 illustrates an appearance of a multi-head composed of an array of a number of heads as shown in FIG. 3. Incidentally, FIG. 3 is a cross-sectional view of the head taken along the flow path of the ink, and FIG. 4 is a cross-sectional view taken along line 4–4' in FIG. 3.

Figure 6:
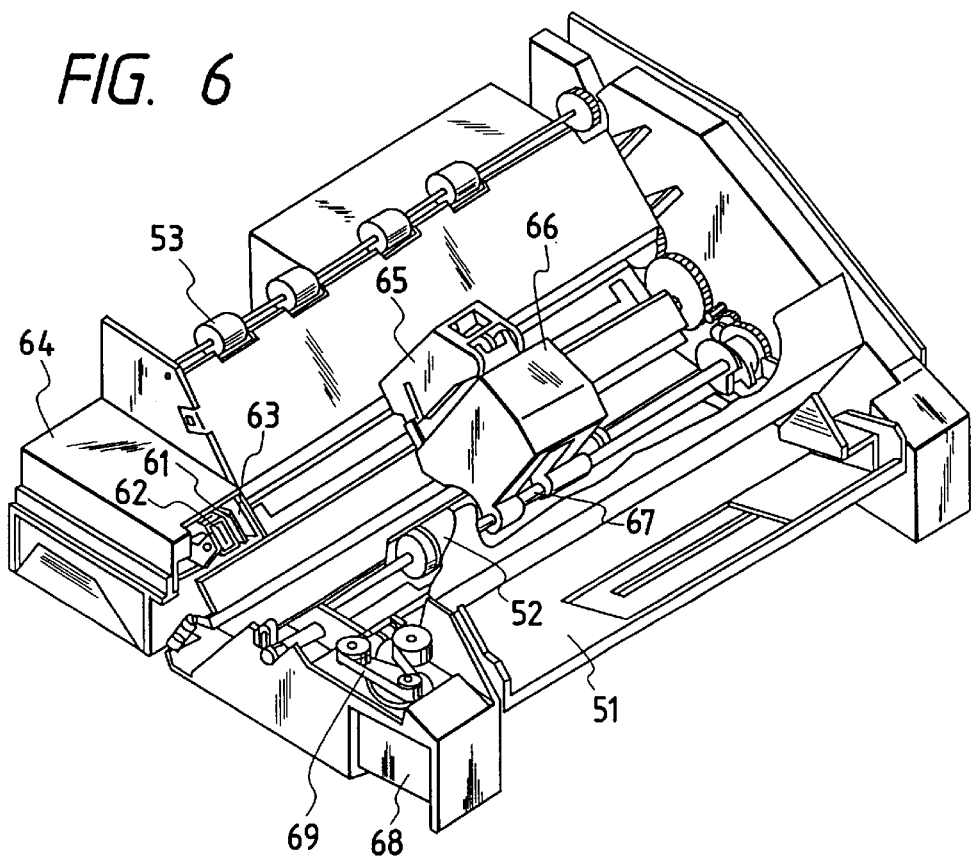
FIG. 6 is a perspective view illustrating an exemplary ink-jet recording apparatus.

FIG. 6 illustrates an example of an ink-jet recording apparatus in which such a head has been incorporated. In FIG. 6, reference numeral 61 designates a blade serving as a wiping member, one end of which is a stationary end held by a blade-holding member to form a cantilever. The blade 61 is provided at a position adjacent to a region in which a recording head operates, and is held in such a form that it protrudes to the course through which the recording head is moved.

Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved.

The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation with the ejection opening face provided with ejection openings to conduct recording. Reference numeral 66 indicates a carriage on which the recording head 65 is mounted so that the recording head 65 can be moved.

The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such construction, the recording medium is fed to the position opposite to the ejection opening face of the recording head, and discharged from a discharge section provided with discharge rollers 53 with the progress of recording.

In the above constitution, the cap 62 in the head recovery portion 64 is receded from the course of motion of the recording head 65 when the recording head 65 is returned to its home position, for example, after completion of recording, and the blade 61 remains protruded to the course of motion. As a result, the ejection opening face of the recording head 65 is wiped. When the cap 62 comes into contact with the ejection opening face of the recording head 65 to cap it, the cap 62 is moved so as to protrude to the course of motion of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 7:
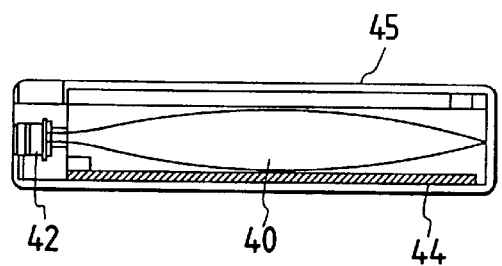
FIG. 7 is a longitudinal cross-sectional view illustrating an exemplary ink cartridge.

FIG. 7 illustrates an exemplary ink cartridge 45 in which an ink to be fed to the head through an ink-feeding member, for example, a tube is contained.

Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

It is preferred that the ink container portion be formed of a polyolefin, in particular, polyethylene, at its surface with which the ink comes into contact.

The ink-jet recording apparatus used in the present invention need not be limited to the apparatus as described above in which the head and the ink cartridge are separately provided. Therefore, a device in which these members are integrally formed as shown in FIG. 8 can also be preferably used.

Figure 8:
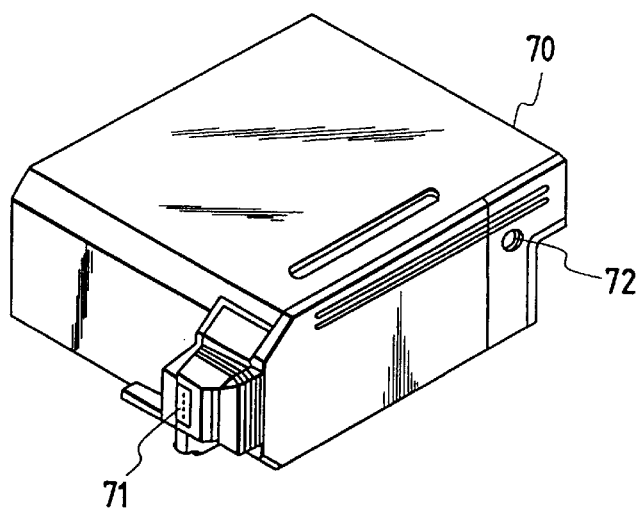
FIG. 8 is a perspective view of a unit in which an ink-jet recording head and an ink cartridge are integrally combined.

In FIG. 8, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices.

In the present invention, polyurethane is preferably used as a material for the ink-absorbing member. The recording unit 70 may be so constructed that the ink container portion is a bag for the ink in the interior of which a spring or the like is provided, not the ink-absorbing member. Reference numeral 72 indicates an air passage for communicating the interior of the recording unit 70 with the atmosphere. This recording unit 70 can be used in place of the recording head shown in FIG. 5, and is detachably installed on the carriage 66.

As the second form of the ink-jet recording apparatus, may be mentioned an On-Demand type ink-jet recording apparatus comprising a nozzle-forming base having a plurality of nozzles, pressure-generating elements composed of a piezoelectric material and an electrically conductive material provided in an opposing relation with the nozzles, and an ink filled around the pressure-generating elements, in which the pressure-generating elements are displaced by voltage applied to eject droplets of the ink from the nozzles.

Figure 9:
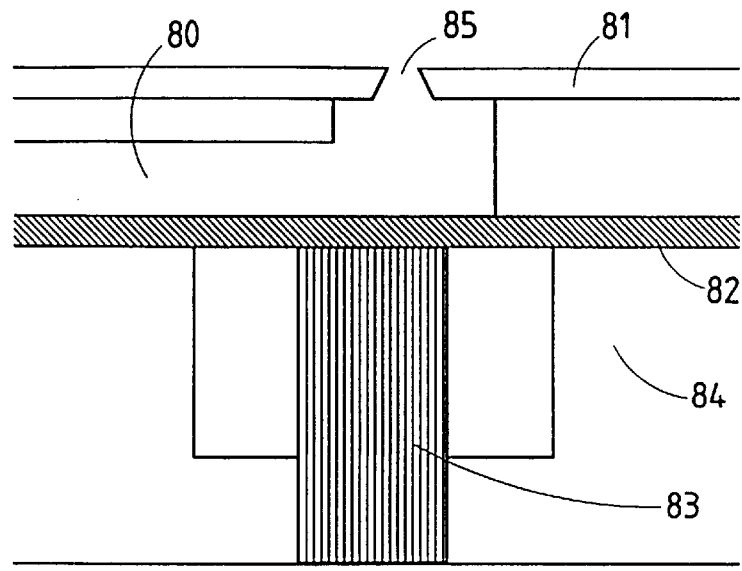
FIG. 9 is a longitudinal cross-sectional view of an ink-jet recording head using a piezoelectric element.

An example of the construction of a recording head, which is a main component of such a recording apparatus, is illustrated in FIG. 9.

The head is composed of an ink flow path 80 communicating with an ink chamber (not illustrated), an orifice plate 81 through which ink droplets having a desired volume are ejected, a vibration plate 82 directly applying a pressure to the ink, a piezoelectric element 83 bonded to the vibration plate 82 undergoing displacement according to an electric signal, and a substrate 84 adapted to support and fix the piezoelectric element 83, the orifice plate 81 and the vibration plate 82 thereon.

In FIG. 9, the ink flow path 80 is formed with a photosensitive resin or the like. The orifice plate 81 is made of a metal such as stainless steel or nickel, the ejection opening 85 of which is defined by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above constitution is operated in such a manner that pulsed voltage is applied to the piezoelectric element 83 to generate a stress to cause distortion, the vibration plate 82 bonded to the piezoelectric element 83 is deformed by the energy of the stress, and the ink in the ink flow path is thus perpendicularly pressurized to eject droplets of the ink from the ejection opening 85 of the orifice plate 81, thereby conducting recording.

Such a recording head is used by incorporating it into a recording apparatus similar to that illustrated in FIG. 6. Operation of details of the recording apparatus may be conducted in the same manner as described above.

The present invention will hereinafter be described specifically by the following examples and comparative examples. Incidentally, all designations of "compositional ratio(s)", and "part(s)" or "%" as will be used in the following examples are by weight unless expressly noted.

First of all, the preparation of various inks according to examples of the present invention and comparative examples will be described. Heat-reversible type thickening polymers used in the examples are shown in the following Table 1. Inks according to the examples were prepared in accordance with the following preparation procedure. Namely, a solution of each of the heat-reversible type thickening polymers shown in Table 1 in deionized water was prepared in a suitable concentration (5 to 20%) in advance. A coloring material, a liquid medium and the like were added to this aqueous solution, thereby preparing an ink.

TABLE 1

Heat-reversible type thickening polymers used in examples

| Kind of polymer | Molecular weight | Viscosity of 10% aq. solution (mPa.s, 25° C.) | Transition temperature (° C.) |
|---|---|---|---|
| A Polymer of morpholinoethyl methacrylate | 1,000,000 | 110 | 30 |
| B Polymer of 2-(2-morpholinoethoxy) ethyl methacrylate | 300,000 | 15 | 46 |
| C Polymer of morpholine ethylene oxide (3 mol) methacrylate | 1,000 | 3 | 55 |
| D Polymer of morpholine ethylene oxide (3 mol) methacrylate | 300,000 | 12 | 55 |
| E Polymer of 3,5-dimethylmorpholine ethylene oxide (4 mol) methacrylate | 40,000 | 7 | 75 |
| F Polymer of morpholine ethylene oxide (5 mol) methacrylate | 80,000 | 10 | 85 |
| G Copolymer of morpholine ethylene oxide (3 mol) methacrylate-ω-morpholinopolyethylene glycol (10 mol)-polypropylene glycol (22 mol)-polyethylene glycol (10 mol) monomethacrylate | 40,000 | 3 | 45, 55 |

EXAMPLES 1 to 9

[1] In these examples, inks where dyes were used as coloring materials will be described.

Their corresponding polymers shown in Table 1 were used to prepare aqueous solutions thereof, and deionized water, solvents, an aqueous solution of a dye and optionally a surfactant were added to the solutions in that order with stirring to prepare compositions in their corresponding concentrations shown in Tables 2-1 and 2-2. After stirring the compositions for 3 hours, they were filtered through a membrane filter having a pore size of 0.45 μm, thereby preparing black inks (Examples 1 to 6) and color inks (yellow, magenta and cyan, Examples 7 to 9) according to the present invention.

TABLE 2-1

Compositions of black inks according to Examples 1 to 6

| | Example | | | | | |
|---|---|---|---|---|---|---|
| | 1 | 2 | 3 | 4 | 5 | 6 |
| C.I. Direct Black 19 | 3.0 | 3.0 | 3.0 | 3.0 | 3.0 | 3.0 |
| 1,2-Ethanediol | 15.0 | 15.0 | 15.0 | 15.0 | 15.0 | 15.0 |
| 2-Propanol | 2.0 | 2.0 | 2.0 | 2.0 | 2.0 | 2.0 |
| Urea | — | — | 3.0 | 3.0 | — | — |

TABLE 2-1-continued

Compositions of black inks according to Examples 1 to 6

| | Example | | | | | |
|---|---|---|---|---|---|---|
| | 1 | 2 | 3 | 4 | 5 | 6 |
| Acetylenol EH* | 0.2 | 0.2 | 0.2 | 0.2 | 0.2 | 0.2 |
| Heat-reversible type thickening polymer | | | | | | |
| Kind | A | B | C | D | E | F |
| Amount added (solid) | 0.005 | 0.5 | 10.0 | 2.0 | 2.0 | 1.0 |
| Deionized water | 79.795 | 79.3 | 66.8 | 74.8 | 77.8 | 78.8 |

*: Acetylenol EH is a surfactant produced by Kawaken Fine Chemicals Co., Ltd.

TABLE 2-2

Compositions of color inks according to Examples 7 to 9

| | Example | | |
|---|---|---|---|
| | 7 | 8 | 9 |
| C.I. Direct Yellow 86 | 2.0 | — | — |
| C.I. Direct Red 227 | — | 3.0 | — |
| C.I. Acid Blue 9 | — | — | 2.0 |
| 1,2-Ethanediol | 15.0 | 15.0 | 15.0 |
| 2-Propanol | 2.0 | 2.0 | 2.0 |
| Urea | 3.0 | 3.0 | 3.0 |
| Acetylenol EH* | 0.2 | 0.2 | 0.2 |
| Heat-reversible type thickening polymer | | | |
| Kind | G | G | G |
| Amount added (solid) | 2.0 | 2.0 | 2.0 |
| Deionized water | 75.8 | 74.8 | 75.8 |

*: Acetylenol EH is a surfactant produced by Kawaken Fine Chemicals Co., Ltd.

Comparative Examples 1 to 5

As comparative examples, inks were prepared in the same manner as in Examples 1 to 9 except that no heat-reversible type thickening polymer was used, thereby providing them as inks of Comparative Examples 1 to 5. More specifically, components other than the heat-reversible type thickening polymers according to Examples 1 to 9 shown in Table 2 and deionized water, and their amounts were made equal to those of their corresponding examples to prepare inks. Incidentally, the ink of Comparative Example 1 was an ink corresponding to Examples 1, 2, 5 and 6, the ink of Comparative Example 2 was an ink corresponding to Examples 3 and 4, and the inks of Comparative Examples 3 to 5 were inks corresponding to Examples 7 to 9, respectively. In each comparative example,, deionized water was additionally supplied in the amount of the heat-reversible type thickening polymer omitted.

EXAMPLE 10

[2] In this example, an ink where a pigment was used as the second coloring material will be described.

First of all, a pigment dispersion was prepared. Components shown in the following Table 3 were mixed and heated to 70° C. on a water bath to completely dissolve a resin component therein. To the resultant solution, were added 10 g of carbon black (MCF 88, product of Mitsubishi Chemical Industries Limited) and 1 g of 2-propanol to premix them for 30 minutes. Thereafter, the resultant premix was subjected to a dispersion treatment. A sand grinder (manufactured by Igarashi Kikai K. K.) was used as a grinder to conduct a grinding treatment for 3 hours under conditions that zirconium beads (diameter: 1 mm) were used as a grinding medium so as to give a packing rate of 50%. The thus-ground mixture was further subjected to a centrifugal treatment (12,000 rpm, 20 minutes) to remove coarse particles into a dispersion.

TABLE 3

| Composition of pigment dispersion | |
|---|---|
| Styrene-ethyl acrylate copolymer (acid value: 150, molecular weight: 5,000) | 1.5 g |
| Monoethanolamine | 1.0 g |
| Diethylene glycol | 81.5 g |
| Deionized water | 5.0 g |

To the above mixture, were added 10 g of carbon black and 1 g of 2-propanol to prepare 100 g of the pigment dispersion.

(Preparation of ink)

An aqueous solution of Polymer D shown in Table 1 was then added to the above-obtained dispersion, and other components were further added so as to give a composition shown in Table 4. The resultant composition was mixed for 2 hours, thereby preparing an ink according to Example 10.

TABLE 4

| Composition of ink according to Example 10 | |
|---|---|
| Pigment dispersion | 30% |
| Heat-reversible type thickening polymer | |
| Kind | D |
| Amount added (solid) | 2% |
| N-Methyl-2-pyrrolidone | 15% |
| Ethanol | 2% |
| Deionized water | 51% |

Comparative Example 6

As a comparative example, an ink was prepared in the same manner as in Example 10 except that no heat-reversible type thickening polymer was used, thereby providing it as an ink of Comparative Example 6. In this comparative example, deionized water was additionally supplied in the amount of the heat-reversible type thickening polymer omitted.

EXAMPLES 11 and 12

[3] In these examples, inks where fine coloring material particles were used as the third coloring material will be described.

(Preparation of dispersion of fine coloring material particles)

First of all, a fine particle dispersion, S2467N (product of Japan Synthetic Rubber Co., Ltd., solid content: 8.0%, pH: 8.0, particle diameter: 18 nm) was heated to 60° C., to which an aqueous solution of a dye (C.I. Direct Black 19, 10%) was added drop by drop with stirring. These components were mixed so as to give a final volume ratio of S2467N to the aqueous solution of the dye of 3:1, and the resultant mixture was further stirred for 8 hours. The liquid mixture was subsequently filtered through a membrane filter having a pore size of 0.45 μm, thereby preparing a dispersion of fine coloring material particles.

(Preparation of ink)

An aqueous solution of Polymer D shown in Table 1 and solvents were then added to the above-obtained dispersion, and these components were mixed so as to give a composition shown in Table 5, thereby preparing an ink according to Example 11.

TABLE 5

| Composition of ink according to Example 11 | |
|---|---|
| Dispersion of fine coloring material | 70% |
| Heat-reversible type thickening polymer | |
| Kind | D |
| Amount added (solid) | 2% |
| Dipropylene glycol monomethyl ether | 5% |
| Diethylene glycol | 15% |
| Deionized water | 8% |

On the other hand, an aqueous solution of Polymer D and solvents were added to the above dispersion of the fine coloring material particles and the pigment dispersion obtained in Example 10 so as to give a composition shown in Table 6. The resultant composition was mixed for 2 hours, thereby preparing an ink according to Example 12.

TABLE 6

| Composition of ink according to Example 12 | |
|---|---|
| Dispersion of fine coloring material | 50% |
| Pigment dispersion | 10% |
| Heat-reversible type thickening polymer | |
| Kind | D |
| Amount added (solid) | 2% |
| Dipropylene glycol monomethyl ether | 5% |
| Diethylene glycol | 15% |
| Deionized water | 18% |

Comparative Examples 7 and 8

As comparative examples to Examples 11 and 12, inks were prepared in the same manner as in Examples 11 and 12, respectively, except that no heat-reversible type thickening polymer was used, thereby providing them as inks of Comparative Examples 7 and 8. In each comparative example, deionized water was additionally supplied in the amount of the heat-reversible type thickening polymer omitted.

EXAMPLES 13

[4] In this example, an ink where a dispersion of uncoloring, hydrophobic fine particles was added will be described. Following the same procedure as in Examples 1 to 9, individual components were mixed so as to give a composition shown in Table 7, thereby preparing an ink according to Example 13.

TABLE 7

Composition of ink according to Example 13

| | |
|---|---|
| C.I. Direct Black 19 | 3.0% |
| fine particle dispersion* | 2.0% |
| Heat-reversible type thickening polymer | |
| Kind | D |
| Amount added (solid) | 2.0% |
| 1,2-Ethanediol | 15.0% |
| 2-Propanol | 2.0% |
| Urea | 3.0% |
| Acetylenol EH | 0.2% |
| Deionized water | 72.8% |

*: A colloidal dispersion of a polyacrylic ester (trade name: SX986 (A), solid content: 35%, pH: 7.5, Tg: 10° C., particle diameter: 35 nm, product of Japan Synthetic Rubber Co., Ltd.)

Comparative Example 9

As a comparative example, an ink was prepared in the same manner as in Example 13 except that neither fine particle dispersion nor heat-reversible type thickening polymer was used, thereby providing it as an ink of Comparative Example 9. In this comparative example, deionized water was additionally supplied in the amount of the fine particle dispersion and heat-reversible type thickening polymer omitted.

[Evaluation]

With respect to the inks of Examples 1 to 13 and Comparative Examples 1 to 9, the performance as an ink-jet ink was evaluated. Three performance items of (1) optical density (OD value), (2) resistance to feathering and (3) resistance to bleeding were evaluated. Each evaluation was conducted in an air-conditioned laboratory controlled at 23° C. and 60% RH. The evaluation methods of the respective items will hereinafter be described specifically.

(1) Optical density (OD value)

A pattern including 5 solid printed areas of 5 mm square was printed on an A4-sized paper sheet. After the resulting print sample was left over for at least 30 minutes, its optical density was measured. The optical densities of the 5 solid printed areas were measured by a Macbeth reflection densitometer RD914, and their average value was taken as an OD value of the sample. Incidentally, the shot-in ink quantity at each solid printed area was 12 nl/mm$^2$.

(2) Resistance to feathering

Dots were recorded on an A4-sized paper sheet with nozzles of a recording head thinned out every other nozzle. After the thus-obtained print sample was left over for at least 30 minutes, its dots were observed through a magnifier and the resistance to feathering was evaluated in terms of 5 ranks as 5 where they were round, 4 where they underwent feathering or deformation at a quarter of their circumference, 3 where they underwent feathering or deformation at a half of their circumference, 2 where they underwent feathering or deformation at three quarters of their circumference, or 1 where they had no round area.

(3) Resistance to bleeding

Figure 10A:
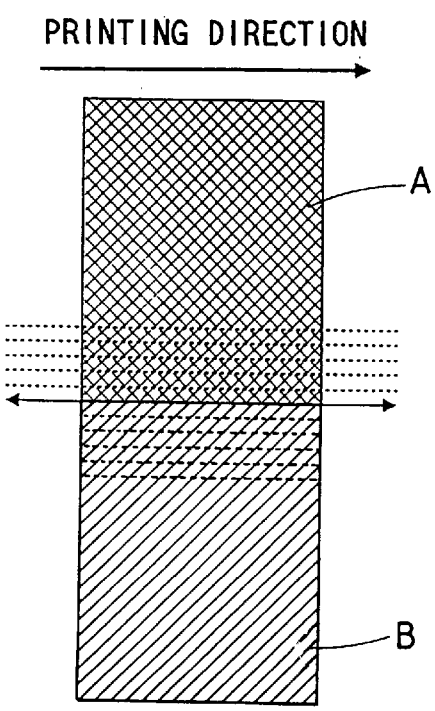
FIGS. 10A and 10B illustrate a pattern for evaluating bleeding.
Figure 10B:
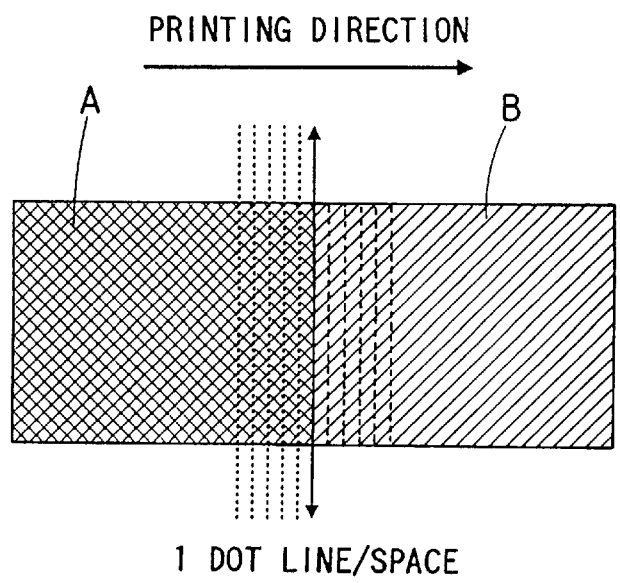

Patterns shown in FIGS. 10A and 10B were provided. The level of bleeding was divided into 5 ranks, and the resistance to bleeding was evaluated in terms of 5 ranks by taking, as a level of bleeding, a position of a line, to which color mixing (bleeding) extended from a boundary line (a line with arrowheads at both ends in each drawing) between two different colors (ranked as 5 where bleeding extended only to one dot line from the boundary line, or 4, 3, 2 or 1 according to which line bleeding occurred to). In FIG. 10, reference characters A and B indicate patterns printed with inks of A and B colors, respectively. The boundary line between the two colors was indicated by the line with arrowheads at both ends. Five lines at an interval of 1 dot line/space were recorded.

[Machine used in evaluation]

As a recording apparatus for the above evaluation, was used an ink-jet printer BJ820J (trade name, manufactured by Canon Inc.). The supply of ink was conducted in accordance with a method in which the intended inks are filled in the respective special ink containers.

Figure 11:
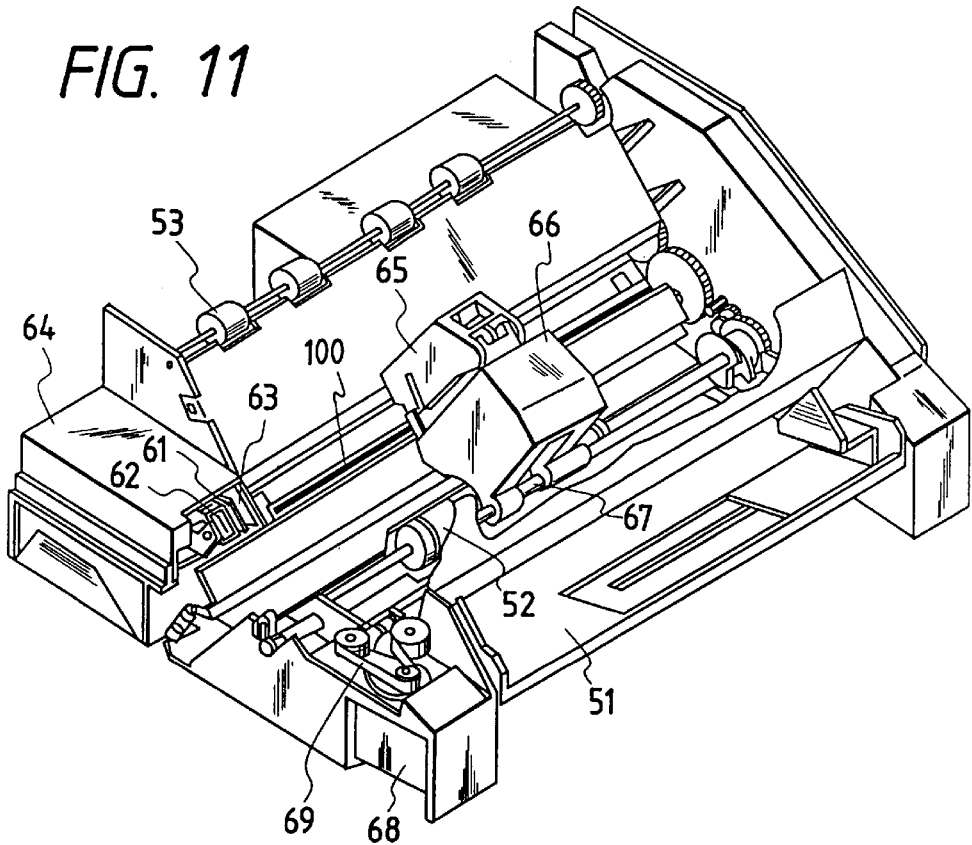
FIG. 11 is a perspective view illustrating an exemplary ink-jet recording apparatus equipped with a heating element.

Incidentally, a mechanism for heating a paper sheet during recording was incorporated in BJ820J. An outline of such a mechanism is illustrated in FIG. 11. The recording apparatus illustrated in FIG. 11 was constructed by arranging a heating element 100 in the basic recording apparatus illustrated in FIG. 6. As the heating element 100, was used an aluminum plate of 230 mm long, 10 mm wide and 1.5 mm thick, on which NiCr was deposited as a heating resistor in a linear form. The surface of paper can be heated within a range of from 30° C. to 140° C. at an environmental temperature of 23° C. by controlling supply voltage and electric power pulse width to this heating element 100. It is also possible to heat the recording medium in synchronism with recording signals.

The evaluation was performed by controlling the temperature of the heating element in the recording apparatus so as to heat the surface of the paper to (the transition temperature of the heat-reversible type thickening polymer contained in the ink in each example+15° C.) (the heating element comes into contact with the surface of the paper sheet). The inks of the comparative examples corresponding to the examples were also evaluated by conducting recording under conditions set in the same manner as in the inks of the examples.

The evaluation of the above evaluation items (1), (2) and (3) was conducted with NP-SK paper (Lot No. OKK10) for electrophotography.

(Result of evaluation)

In Table 8, are shown the results of the performance evaluation [evaluation items (1) and (2)] as to the inks according to Examples 1 to 13 of the present invention. The inks of the comparative examples were also evaluated in the same manner as in the examples. The results thereof are shown in Table 9.

The evaluation as to the resistance to bleeding of the item (3) was conducted using the evaluation pattern shown in FIG. 10. The results thereof are shown in Table 9. The results of the evaluation as to the inks of the comparative examples are shown in Table 11.

TABLE 8

Evaluation results of examples

| Ink | OD value | Resistance to feathering |
|---|---|---|
| Example 1 | 1.48 | 4 |
| Example 2 | 1.42 | 4 |
| Example 3 | 1.39 | 4 |
| Example 4 | 1.47 | 5 |
| Example 5 | 1.44 | 5 |
| Example 6 | 1.41 | 5 |
| Example 7 | 1.07 | 5 |
| Example 8 | 1.25 | 4 |
| Example 9 | 1.31 | 4 |
| Example 10 | 1.41 | 4 |
| Example 11 | 1.37 | 5 |

TABLE 8-continued

Evaluation results of examples

| Ink | OD value | Resistance to feathering |
|---|---|---|
| Example 12 | 1.40 | 5 |
| Example 13 | 1.45 | 5 |

TABLE 9

Evaluation results of comparative examples

| Ink | OD value | Resistance to feathering |
|---|---|---|
| Comparative Example 1 | 1.20 | 3 |
| Comparative Example 2 | 1.21 | 4 |
| Comparative Example 3 | 0.75 | 3 |
| Comparative Example 4 | 0.80 | 3 |
| Comparative Example 5 | 0.86 | 3 |
| Comparative Example 6 | 1.22 | 3 |
| Comparative Example 7 | 1.15 | 4 |
| Comparative Example 8 | 1.22 | 4 |
| Comparative Example 9 | 1.24 | 4 |

TABLE 10

Evaluation results as to bleeding of examples

| | Color ink | | |
|---|---|---|---|
| Bk ink | Y ink Example 7 | M ink Example 8 | C ink Example 9 |
| Example 1 | 4 | 5 | 4 |
| Example 2 | 4 | 4 | 4 |
| Example 3 | 5 | 5 | 5 |
| Example 4 | 5 | 5 | 5 |
| Example 5 | 4 | 4 | 4 |
| Example 6 | 4 | 4 | 4 |
| Example 10 | 4 | 3 | 3 |
| Example 11 | 3 | 3 | 4 |
| Example 12 | 4 | 4 | 4 |
| Example 13 | 4 | 4 | 4 |

TABLE 11

Evaluation results as to bleeding of comparative examples

| | Color ink | | |
|---|---|---|---|
| Bk ink | Y ink Comp. Example 3 | M ink Comp. Example 4 | C ink Comp. Example 5 |
| Comp. Example 1 | 2 | 3 | 3 |
| Comp. Example 2 | 3 | 3 | 3 |
| Comp. Example 6 | 1 | 2 | 2 |
| Comp. Example 7 | 2 | 2 | 2 |
| Comp. Example 8 | 1 | 1 | 1 |
| Comp. Example 9 | 1 | 1 | 1 |

Remarks: In the evaluation patterns shown in FIGS. 10A and 10B, there is used a color ink for the reference character A, and a black ink for the reference character B.

According to the present invention, as apparent from the results shown in Tables 8 to 11, there are provided excellent inks which can provide high-quality images on which feathering occurs to a less extent than the conventional inks while maintaining high image density. The inks according to the present invention are said to have a great effect of preventing color mixing owing to their rapid increase in viscosity on the surface of paper. Therefore, the present invention also provides inks which can effectively prevent the occurrence of bleeding.

The inks according to the present invention can achieve high color strength and have excellent effects of preventing the occurrence of feathering and bleeding, in particular, in color recording on plain paper for offices, such as paper for electrophotography.

Since the inks according to the present invention undergo the change of state only by temperature change, they are not affected by the surface pH, irregularities and the like of recording media. Therefore, they effectively exhibit the effects on various recording media such as transparent films, cloths and metal sheets in addition to the plain paper.

As described above, the means for forming images with the inks according to the present invention do not depend on only evaporation and penetration, and so the problems of feathering and bleeding, which must be referred to upon high-quality recording, can also be solved at the same time while providing images with high OD values. The inks according to the present invention markedly exhibit such effects when they are used in combination with ink-jet recording apparatus.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A water-based ink-jet ink containing a water-soluble polymer and a coloring material, wherein the water-soluble polymer comprises at least 50% by weight of an ester of (meth)acrylic acid and polyether monool having in its structure an alkylene oxide having a terminus to which a nitrogen-containing alicyclic group is bound.

2. The water-based ink-jet ink according to claim 1, wherein the alkylene oxide comprises at least 1 mole of ethylene oxide or propylene oxide.

3. The water-based ink-jet ink according to claim 1, wherein the alkylene oxide comprises a block copolymer of ethylene oxide and propylene oxide.

4. The water-based ink-jet ink according to claim 1, wherein the water-soluble polymer comprises a copolymer of a vinylcarboxylic ester and the ester of (meth)acrylic acid and polyether monool having in its structure an alkylene oxide having a terminus to which a nitrogen-containing alicyclic group is bound.

5. The water-based ink-jet ink according to claim 4, wherein the vinylcarboxylic ester has the alkylene oxide having a terminus to which a nitrogen-containing alicyclic group is bound.

6. The water-based ink-jet ink according to claim 5, wherein the alkylene oxide is ethylene oxide.

7. The water-based ink-jet ink according to claim 1 or 5, wherein the nitrogen-containing alicyclic group has a piperidine ring or a morpholine ring.

8. The water-based ink-jet ink according to claim 7, wherein the morpholine ring is an unsubstituted morpholine ring, a 2-methylmorpholine ring or a 3,5-dimethylmorpholine ring.

9. The water-based ink-jet ink according to claim 4, wherein the vinylcarboxylic ester is represented by the following formula (I)

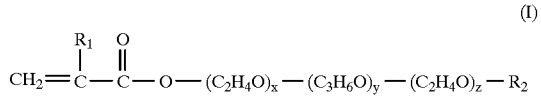

wherein $R_1$ is H or $CH_3$, $R_2$ is a substituted group derived from a compound selected from the group consisting of the nitrogen-containing alicyclic compounds of the formulae

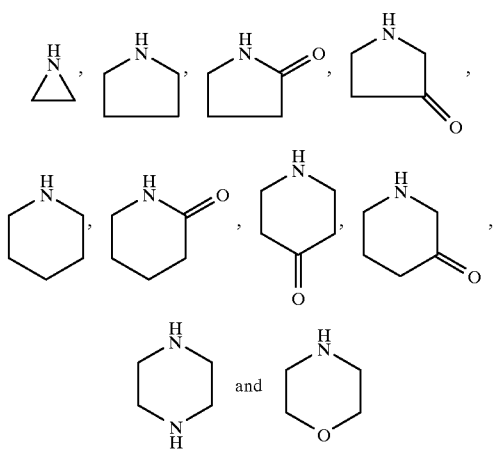

and bonded by a nitrogen atom thereof, x is an integer of 2 to 50, y is an integer of 1 to 50, and z is 0 or an integer of 1 to 50.

10. The water-based ink-jet ink according to claim 1, wherein the water-soluble polymer has a weight average molecular weight of from 1,000 to 1,000,000.

11. The water-based ink-jet ink according to claim 1, wherein the water-soluble polymer is contained in an amount of from 0.005 to 10% by weight in the ink.

12. The water-based ink-jet ink according to claim 1, wherein the coloring material is selected from the group consisting of dyes, pigments and fine particles having surfaces to which a dye is bonded.

13. The water-based ink-jet ink according to claim 12, wherein the pigment is carbon black or an organic pigment.

14. The water-based ink-jet ink according to claim 12, wherein the dye is chemically bonded to the surface of the fine particle by a reactive group on the surface.

15. The water-based ink-jet ink according to claim 14, wherein the reactive group is selected from the group consisting of a carboxyl group, a hydroxyl group, an amino group, an epoxide group, an amide group, a hydroxymethyl group and an isocyanate group.

16. A water-based ink-jet ink containing a water-soluble polymer and a coloring material, wherein the water-soluble polymer comprises an ester of (meth)acrylic acid and polyether monool having in its structure an alkylene oxide having a terminus to which a nitrogen-containing alicyclic group is bound, and wherein the ink has a transition temperature at which viscosity of the ink increases when the ink's temperature exceeds the transition temperature.

17. The water-based ink-jet ink according to claim 16, wherein a change of the ink's viscosity when the ink is heated to exceed the transition temperature is substantially equivalent to a change of the ink's viscosity when the ink is cooled from a temperature higher than the transition temperature.

18. The water-based ink-jet ink according to claim 16, wherein the alkylene oxide comprises at least 1 mole of ethylene oxide or propylene oxide.

19. The water-based ink-jet ink according to claim 16, wherein the alkylene oxide comprises a block copolymer of ethylene oxide and propylene oxide.

20. The water-based ink-jet ink according to claim 16, wherein the water-soluble polymer comprises a copolymer of a vinylcarboxylic ester and the ester of (meth)acrylic acid and polyether monool having in its structure an alkylene oxide having a terminus to which a nitrogen-containing alicyclic group is bound.

21. The water-based ink-jet ink according to claim 20, wherein the vinylcarboxylic ester has the alkylene oxide having a terminus to which a nitrogen-containing alicyclic group is bound.

22. The water-based ink-jet ink according to claim 21, wherein the alkylene oxide is ethylene oxide.

23. The water-based ink-jet ink according to claim 21, wherein the nitrogen-containing alicyclic group has a piperidine ring or a morpholine ring.

24. The water-based ink-jet ink according to claim 23, wherein the morpholine ring is an unsubstituted morpholine ring, a 2-methylmorpholine ring or a 3,5-dimethylmorpholine ring.

25. The water-based ink-jet ink according to claim 20, wherein the ester is represented by the following formula (I):

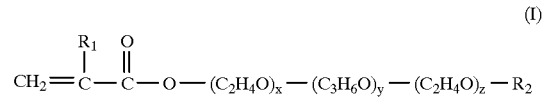

wherein $R_1$ is H or $CH_3$, $R_2$ is a substituted group derived from a compound selected from the group consisting of the nitrogen-containing alicyclic compounds of the formulae

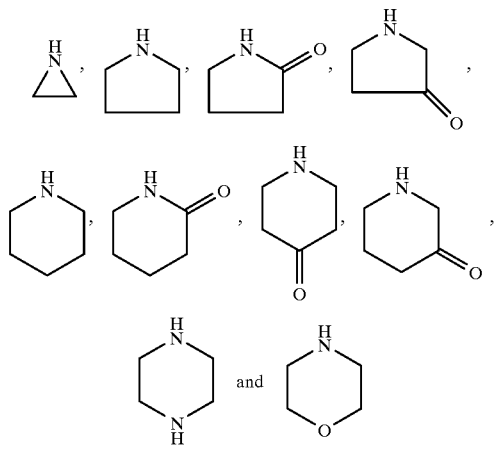

and bonded by a nitrogen atom thereof, x is an integer of 2 to 50, y is an integer of 1 to 50, and z is 0 or an integer of 1 to 50.

26. The water-based ink-jet ink according to claim 16, wherein the polymer has a weight average molecular weight of from 1,000 to 1,000,000.

27. The water-based ink-jet ink according to claim 16, wherein the polymer is contained in an amount of from 0.005 to 10% by weight in the ink.

28. The water-based ink-jet ink according to claim 16, wherein the coloring material is selected from the group consisting of dyes, pigments and fine particles having surfaces to which a dye is bonded.

29. The water-based ink-jet ink according to claim 28, wherein the pigment is carbon black or an organic pigment.

30. The water-based ink-jet ink according to claim 28, wherein the dye is chemically bonded to the surface of the fine particle by a reactive group on the surface.

31. The water-based ink-jet ink according to claim 30, wherein the reactive group is selected from the group consisting of a carboxyl group, a hydroxyl group, an amino group, an epoxide group, an amide group, a hydroxymethyl group and an isocyanate group.

* * * * *

UNITED STATES PATENT AND TRADEMARK OFFICE
CERTIFICATE OF CORRECTION

PATENT NO. : 5,955,515

DATED : September 21, 1999

INVENTOR(S) : ISAO KIMURA, ET AL.

It is certified that error appears in the above-identified patent and that said Letters Patent is hereby corrected as shown below:

ON THE COVER PAGE:

Item [56] References Cited - U.S. PATENT DOCUMENTS

After the last line, insert
--5,439,515 8/1995 Kurabayashi et al. ..106/20 R--.

Item [56] References Cited - FOREIGN PATENT DOCUMENTS

"01272623" should read -- 1-272623 --.
"03172362" should read -- 3-172362 --.
"03240586" should read -- 3-240586 --.
"6009848" should read -- 6-9848 --.

IN THE DISCLOSURE:

COLUMN 6:

Line 15, "(; or" should read --(or--.
Line 44, "Example" should read --Examples-- and "compound" should read --compounds--.

UNITED STATES PATENT AND TRADEMARK OFFICE
CERTIFICATE OF CORRECTION

PATENT NO. : 5,955,515

DATED : September 21, 1999

INVENTOR(S) : ISAO KIMURA, ET AL.

It is certified that error appears in the above-identified patent and that said Letters Patent is hereby corrected as shown below:

COLUMN 7:

Line 33, "styrene:sulfonic" should read --styrenesulfonic--.
Line 36, "butyl (meth)acryl(met" should read --butyl(meth)acrylate,--.
Line 57, "mPa.s/°" should read --mPa·s/°--.

COLUMN 10:

Line 37, "mPa.s" should read --mPa·s--.

COLUMN 12:

Line 51, "particle" should read --particles--.

COLUMN 14:

Line 19, "an head," should read --a head,--.

UNITED STATES PATENT AND TRADEMARK OFFICE
CERTIFICATE OF CORRECTION

PATENT NO.   : 5,955,515

DATED        : September 21, 1999

INVENTOR(S) : ISAO KIMURA, ET AL.

It is certified that error appears in the above-identified patent and that said Letters Patent is hereby corrected as shown below:

<u>COLUMN 16</u>:

Line 17, "On-Demand" should read --on-demand--.

Signed and Sealed this

Nineteenth Day of December, 2000

Attest:

Q. TODD DICKINSON

*Attesting Officer*          *Commissioner of Patents and Trademarks*